F. W. SEIDL.
CLASP.
APPLICATION FILED JAN. 23, 1908.
913,854.
Patented Mar. 2, 1909.
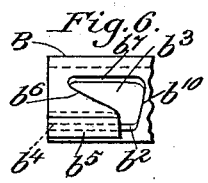
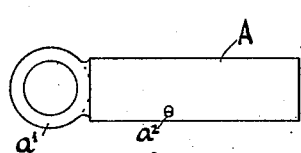
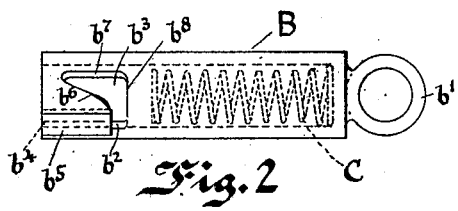
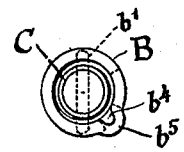
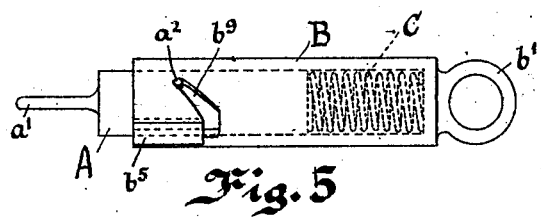
Witnesses
Frank W. Seidl, Inventor
By
Attorney

UNITED STATES PATENT OFFICE

FRANK W. SEIDL, OF MANITOWOC, WISCONSIN.

CLASP.

No. 913,854.      Specification of Letters Patent.      Patented March 2, 1909.

Application filed January 23, 1908. Serial No. 412,253.

*To all whom it may concern:*

Be it known that I, FRANK W. SEIDL, of Manitowoc, Wisconsin, have invented a Clasp, of which the following is a specification.

This invention relates to clasps of the kind more particularly used for articles of personal adornment such as necklaces, bracelets, key-chains and the like; although it will be understood, that, made on a larger scale, it can be used for joining the ends of any cord or chain, or for like purposes for which a clasp is or may be used.

The general type of these clasps involves two telescoping and interchanging members, the outer member or socket having a bayonet slot and the inner member or plug having a pin engaging with said bayonet slot when inserted into the socket and then rotated. These clasps as thus far made have certain disadvantages which it is the object of my present invention to avoid. In particular, the formation of the bayonet slot leaves a projecting L-shaped part of the wall of the socket which, by reason of its sharp corners, is not only liable to become entangled with and tear objects in its vicinity such as clothing, lace etc., but is also quickly bent or broken away rendering the clasp useless. Moreover such clasps are liable to become self-disconnected by accidental pressure which may be brought to bear to press them together momentarily.

It is the aim of the present invention therefore to produce a clasp which shall have no projecting corners or elements to become torn or twisted or to tear or scratch other objects, and which moreover shall not be subject to self-disengagement.

To illustrate my clasp I have shown in the accompanying drawings, on a magnified scale, a clasp such as is used in necklaces and the like, constructed according to my invention.

In these drawings Figures 1 and 2 show in side elevation the respective members of the clasp; Figs. 3 and 4 show the same members respectively in end elevation; Fig. 5 shows in side elevation the two members of the clasp united; a modification of the locking slot being also shown in this figure. Fig. 6 shows an alternative form of the outer member of the clasp.

In these drawings every reference letter and numeral refers always to the same part.

The two members which constitute the clasp are the plug A and the socket B, each being of cylindrical form, and the barrel of the socket fitting the body of the plug. Each member will ordinarily be provided with some means for connecting a chain or the like thereto, such as a ring, $a'$ on the plug and $b'$ on the socket. The engaging means between the plug and socket consists of a pin or peg $a^2$ on the body of the plug, and the locking slot of peculiar form $b^2$ on the open end of the socket. To form this slot the continuity of the cylindrical barrel of the member B is not broken, but a roughly triangular hole $b^3$ is cut therein and an entering passage $b^4$ leading thereto is formed by pressing up and arching over the metal of the barrel as shown at $b^5$, thus enabling the pin $a^2$ to pass in under the arch $b^5$. It will be noted, that of the three sides of the triangular hole $b^3$, the side $b^6$ extends obliquely downward; the side $b^7$ extends back from the end of the side $b^6$ in a direction parallel to the axis of the cylinder; and the side $b^8$ extends transversely to said axis. The direction and position of each one of these sides constitutes an element of my invention.

To engage the two members of the clasp, the member A is inserted in the member B, the pin $a^2$ passing through the passage $b^4$ and entering into the hole $b^3$; it is then rotated slightly until the pin $a^2$ is out of line with the passage $b^4$ and opposite the side $b^6$. A coiled spring C is socketed in the bottom of the barrel of the member B, and when the member A is pushed thereinto it is compressed thereby and tends to force the member A out; therefore when the member A is inserted and turned in the manner described, the spring C causes the pin $a^2$ to strike the side $b^6$, and the obliquity of said side causes the member A to be rotated still further until the pin rests in the corner between the sides $b^6$ and $b^7$. Should now the two members become accidentally pressed together against the force of the spring C, they would not, even if they be rotated slightly, become disengaged, or make any headway towards disengagement, because as soon as released the spring C forces the pin $a^2$ back again into its corner. This distinguishes it from the ordinary form of bayonet-slot heretofore used in this type of clasp which has a straight transverse branch on which the pin can become lodged and a slight further rotation at any time immediately disconnects the clasp.

Instead of the triangular hole $b^3$ shown in

Fig. 2, I may use consistently with my invention the parallel-sided oblique slot $b^9$, Fig. 5, which has the advantage over the common bayonet-slot that there is no straight transverse portion upon which the pin can become lodged; but it is not so good as the form of Fig. 2, because the pressure of the two members together does tend to rotate the plug in the socket a certain distance toward disconnection. However in neither form of clasp, it will be observed, are there any projecting angles or unsupported corners.

It is not necessary that the side $b^8$ should be strictly at right angles to the axis; it is even better that it be cut out to a slight obliquity in the opposite direction from the side $b^6$ as shown by the lines $b^{10}$ in Fig. 6; then the accidental pushing together of the clasps will also have the effect, when the pin strikes the edge $b^{10}$, of rotating it away from the opening $b^4$.

Having thus described my invention, what I claim as new and desire to secure by Letters Patent is:

1. A clasp of the type described comprising an inner and an outer telescoping-member; said inner member having a projecting pin in the side and said outer member having a locking-slot comprising an entering portion extending longitudinally and an engaging portion extending transversely to the axis and having its side next the outer end extending from said entering portion in an oblique direction toward said outer end, and the side of said engaging portion opposite said oblique side making an angle not less than a right angle with the entering portion of the slot.

2. A clasp of the type described comprising an inner and an outer telescoping-member; said inner member having a projecting pin in the side thereof, and said outer porber having a locking-slot comprising an entering portion and a transverse portion; said entering portion being a passageway formed by pressing up the metal longitudinally of the cylinder, and said transverse portion being a hole connecting at the inner end of said passageway and extending transversely thereto, the outer side of said hole extending at a sharply oblique angle from said passageway toward the open end of said outer member.

3. A clasp of the type described comprising an inner and an outer telescoping member; said inner member having a projecting pin in the side thereof, and said outer member having a locking-slot comprising an entering portion and a transverse portion; said entering portion being a passageway formed by pressing up the metal longitudinally of the cylinder and said transverse portion being a hole connecting at the inner end of said passageway and extending transversely thereto, the outer side of said hole extending from said passageway obliquely toward the open end of said outer member, and the inner side making an angle not less than a right-angle with the entering portion of the slot.

4. A clasp of the type described comprising an inner and an outer telescoping-member; said member having a projecting pin in the side thereof, and said outer member having a locking-slot comprising an entering portion and a transverse portion; said entering portion being a passageway formed by pressing up the metal longitudinally of the cylinder, and said transverse portion being a hole connecting at the inner end of said passageway and extending transversely thereto, the outer side of said hole extending from said passageway toward the open end of said outer member, and the inner side being at an angle at least equal to a right-angle with the entering portion of the slot; and a coiled compression spring at the bottom of said outer member adapted to press outward upon said inner member when the latter is inserted thereinto.

In witness whereof, I have hereunto set my hand this 20 day of January, 1908.

FRANK W. SEIDL.

Witnesses:
   Miss E. D. SEIDL,
   JOHN C. CLELARPET.